US012116827B2

(12) United States Patent
Potter et al.

(10) Patent No.: US 12,116,827 B2
(45) Date of Patent: Oct. 15, 2024

(54) CLOSURE MEMBER STOP AND ASSOCIATED KIT

(71) Applicant: UNITED STATES POSTAL SERVICE, Washington, DC (US)

(72) Inventors: Thomas C. Potter, Oak Hill, VA (US); Scott R. Bombaugh, Burke, VA (US); Terry M. Gingell, Spotsylvania, VA (US); Anthony Taylor, Stafford, VA (US); Christopher M. Stratton, Springfield, VA (US); Benjamin Schwind, Falls Church, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 577 days.

(21) Appl. No.: 17/193,123

(22) Filed: Mar. 5, 2021

(65) Prior Publication Data

US 2021/0277699 A1 Sep. 9, 2021

Related U.S. Application Data

(60) Provisional application No. 63/092,346, filed on Oct. 15, 2020, provisional application No. 62/986,471, filed on Mar. 6, 2020.

(51) Int. Cl.

*E05F 5/00* (2017.01)
*E05F 5/02* (2006.01)
*E05F 5/04* (2006.01)

(52) U.S. Cl.

CPC ................ *E05F 5/027* (2013.01); *E05F 5/04* (2013.01); *E05F 2005/046* (2013.01); *E05Y 2201/224* (2013.01); *E05Y 2900/13* (2013.01)

(58) Field of Classification Search

CPC ....... E05F 5/027; E05F 5/04; E05F 2005/046; E05Y 2201/224; E05Y 2900/13

See application file for complete search history.

(56) References Cited

U.S. PATENT DOCUMENTS

| | | | | |
|---|---|---|---|---|
| 9,683,396 B2 * | 6/2017 | Braselton | ................ | E05C 17/50 |
| 2010/0276065 A1 * | 11/2010 | Blanchard | ............... | B29C 73/24 428/343 |
| 2012/0079680 A1 * | 4/2012 | McRoskey | ............. | E05F 5/003 16/83 |

* cited by examiner

*Primary Examiner* — Daniel J Troy
*Assistant Examiner* — Daniel Alvarez
(74) *Attorney, Agent, or Firm* — MH2 Technology Law Group, LLP

(57) ABSTRACT

A closure member (e.g., door) stop includes a base having a top portion opposite a bottom portion, the bottom portion being configured for affixing to an installation point associated with the closure member, a flexure extending away from the top portion, a cushion comprising an angled face and an impact face, the impact face being configured to interface with the closure member during closing of the closure member, and the angled face being configured to interface with the closure member during opening of the closure member. The flexure provides an operable, bendable connection between the cushion and the base. Also, a lever is operably connected to the cushion and the flexure and configured to move the cushion away from a swing path of the closure member. The cushion extends into a swing path of the closure member when the closure member stop is at rest in the installed position.

20 Claims, 5 Drawing Sheets

CLOSURE MEMBER STOP AND ASSOCIATED KIT

CROSS-REFERENCE TO RELATED APPLICATIONS

This application claims priority to U.S. Provisional Patent Application No. 63/092,346 filed on 15 Oct. 2020, and U.S. Provisional Patent Application No. 62/986,471 filed on 6 Mar. 2020, the contents of each of which are hereby incorporated by reference in their entirety.

FIELD OF THE INVENTION

This invention relates to a device for stopping or preventing a closure member, for example, a heavy-weight door, from closing completely unless and until a person operates the device to allow the closure member to close.

BACKGROUND

Many enclosures (e.g., safes, freezers, refrigerators, emergency shelters, etc.) include a closure member (e.g., a door) configured to allow access to an enclosed space, and then to be closed to provide a desired level of protection for items and/or entities within the enclosure. Closure members associated with such enclosures, due to their protective nature, are typically made of metal or other dense material, and are sturdy and frequently dangerously heavy.

When such a closure member closes unintentionally, due to, for example, gravity, lack of levelness, an unexpected force such as moving air (e.g., wind), and/or being bumped (e.g., by a person), etc., a person desiring to operate the closure member, or even simply in proximity to the closure member, can be surprised by the closure member coming into contact with the enclosure frame unexpectedly (e.g., slamming), and even injured during such an event by squeezing and/or crushing a body part, such as a finger, arm, or foot, between the closure member and the enclosure frame or opening. This is especially true for heavy closure members associated with protective enclosures.

For example, a Google search related to safe door accidents reveals that there have been numerous instances where a person has suffered severe injury when the door of a safe closed while the person had their fingers between the safe body and the door, compressing and squashing the fingers and breaking the finger bones, or in severe cases, severing a finger.

SUMMARY

The present inventors have recognized that it is desirable to reduce or eliminate the dangers from a closure member that fully closes while parts of a user or passersby may be within the swing path of the closure member and a frame of the enclosure. The inventor has further recognized that by stopping or impeding the door from closing completely and/or by providing features causing the user to move their hand(s) away from the door in order to close it, such dangers can be avoided. The inventor has further recognized that it is desirable to be able to easily modify or retrofit existing enclosures (e.g., safes, freezers, refrigerators, etc.) with an inexpensive device that reduces or eliminates the dangers from a closure member without damaging the closure member.

Therefore, according to embodiments of the present invention a closure member stop is provided. The closure member stop includes a base having a top portion opposite a bottom portion, the bottom portion being configured for affixing to an installation point associated with the closure member, a cushion connected to the base and comprising an angled face and an impact face, the impact face being configured to interface with the closure member at least during closing of the closure member, and the angled face being configured to interface with the closure member at least during opening of the closure member, a flexure extending away from the top portion and providing an operative connection between the cushion and the base, and a lever operably connected to the cushion and the flexure, and configured such that upon application of a force to the lever, the cushion is moved in a direction toward or away from a swing path of the closure member according to a vector of the applied force. Prior to application of the force, at least a portion of the cushion extends into a swing path of the closure member when the closure member stop is in the installed position.

By providing such a closure member stop, kinetic energy associated with a moving/swinging closure member may be absorbed and dissipated by the closure member stop prior to full closure of the closure member, and complete closure prevented absent a desire from a user for full closure. Therefore, unwanted closure resulting in possible injury can be avoided. Further, based on the ability of closure member stops according to embodiments of the present disclosure to be affixed or retrofitted aftermarket (i.e. to existing enclosures), substantial cost savings may be achieved by eliminating the need for redesign and repurchase of existing enclosures.

The closure member stop may include a lift stop opposite the flexure on which at least a portion of the flexure and/or the lever is configured to abut when the lever is operated to completely remove the cushion from the swing path.

The cushion may include a support notch having a first face and a second face, the first face being coplanar with and extending parallel to the bottom portion, and the second face extending perpendicularly to the first face toward the closure member.

The flexure may be a living hinge.

The cushion may include one or more voids configured to modify a resistance of the cushion.

The closure member stop may be a monolithic structure, for example, unitarily molded.

The closure member stop may include a resilient material.

The resilient material may include at least one of a molded urethane and a cast urethane.

The closure member may include a swinging door.

The installation point associated with the closure member may be an exterior surface of a safe body.

The bottom portion may include an adhesive configured to affix the base to the installation point.

An angle of the angled face may be configured such that, during opening of the closure member, contact of the closure member on the angled face forces the cushion to move in a direction away from the swing path.

The second face may be configured to, when the closure member contacts the impact face, interface with a mounting frame of the closure member.

The lever may include a knob positioned at a distal end of the lever.

The lever may extend from the closure member stop at an oblique angle relative to the base at a position between the flexure and the cushion.

According to further embodiments of the disclosure, a closure member stop kit is provided. The kit includes a closure member stop including a base having a top portion opposite a bottom portion, the bottom portion being configured for affixing to an installation point associated with the closure member; a cushion connected to the base and comprising an angled face and an impact face, the impact face being configured to interface with the closure member at least during closing of the closure member, and the angled face being configured to interface with the closure member at least during opening of the closure member, a flexure extending away from the top portion and providing an operative connection between the cushion and the base, and a lever operably connected to the cushion and the flexure, and configured such that upon application of a force to the lever, the cushion is moved in a direction toward or away from a swing path of the closure member according to a vector of the applied force, wherein, prior to application of the force, at least a portion of the cushion extends into a swing path of the closure member when the closure member stop is in the installed position. The kit further includes at least one fastener and/or at least one adhesive, and at least one surface cleaning device.

The kit may include a temperature measuring device for measuring a temperature of the installation point.

The kit may include a handle configured to be affixed to a surface of the closure member.

The at least one adhesive may include at least one of an adhesive strip, an adhesive spray, and a two-sided tape.

The kit may include one or more personal protective items for wearing by an installer of the closure member stop.

According to still further embodiments, a closure member stop for impeding a closure member of an enclosure is provided. The closure member stop includes a base having a top portion opposite a bottom portion, the bottom portion being configured for affixing to the enclosure, a flexible flexure that is connected to the base, a cushion comprising an angled face and an impact face, the impact face being configured to interface with the closure member during closing of the closure member, and the angled face being configured to interface with the closure member during opening of the closure member, wherein the cushion is connected to the flexible flexure and the flexible flexure is between the cushion and the base, and a lever that is connected to the cushion and configured such that applying a force to the lever causes the flexible flexure to bend and causes the cushion is moved in a direction away from a swing path of the closure member. When no force is applied to the lever, the flexible flexure causes at least a portion of the cushion to extend into the swing path of the closure member.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DRAWINGS

DETAILED DESCRIPTION

Reference will now be made in detail to embodiments of the invention, examples of which are illustrated in the accompanying figures. Wherever possible, the same reference numbers will be used throughout the drawings to refer to the same or like parts.

Figure 1A:
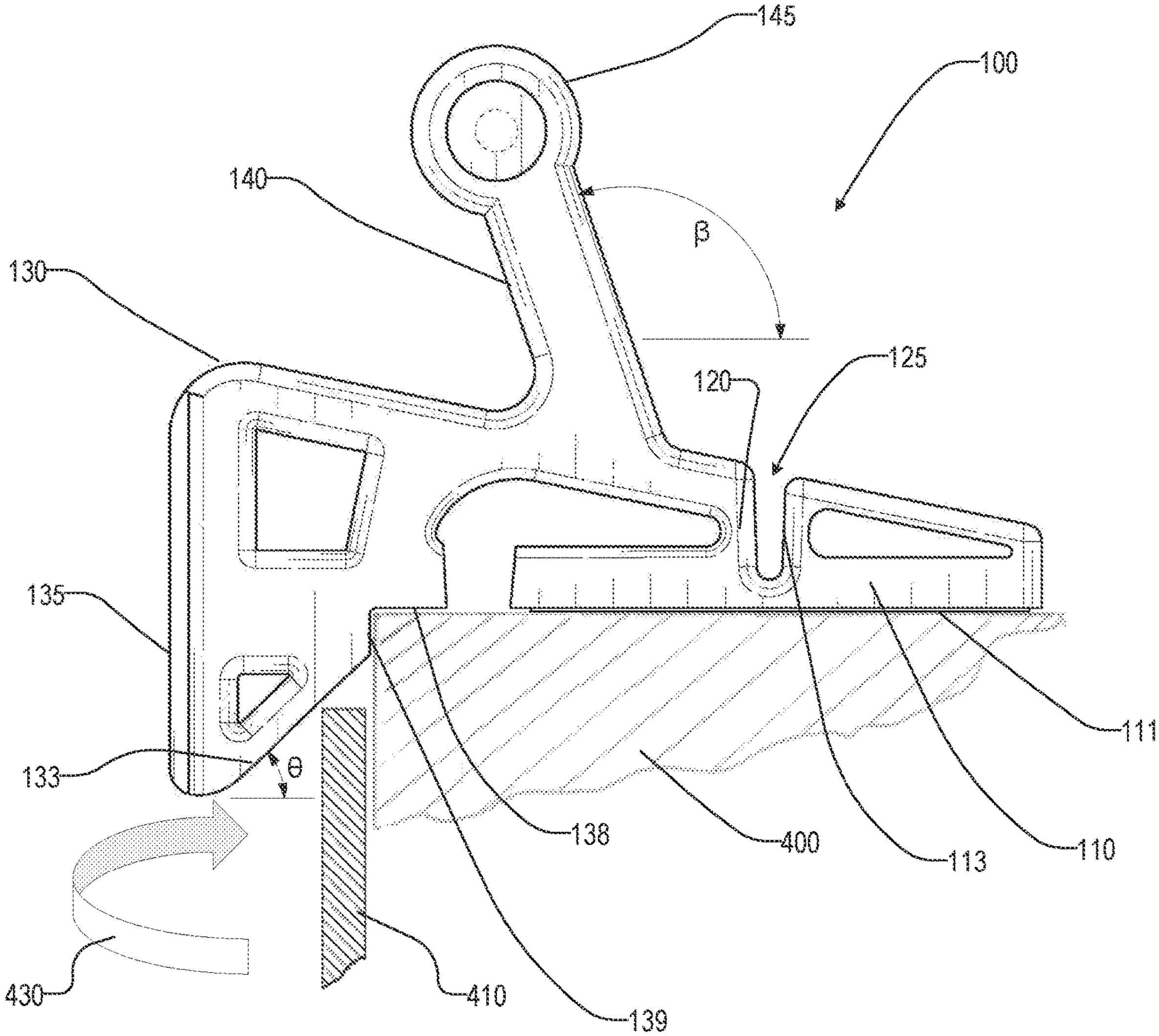
FIG. 1A is a right elevation view of the closure member stop at an installation point of an enclosure with a closure member in a closed position.
Figure 1B:
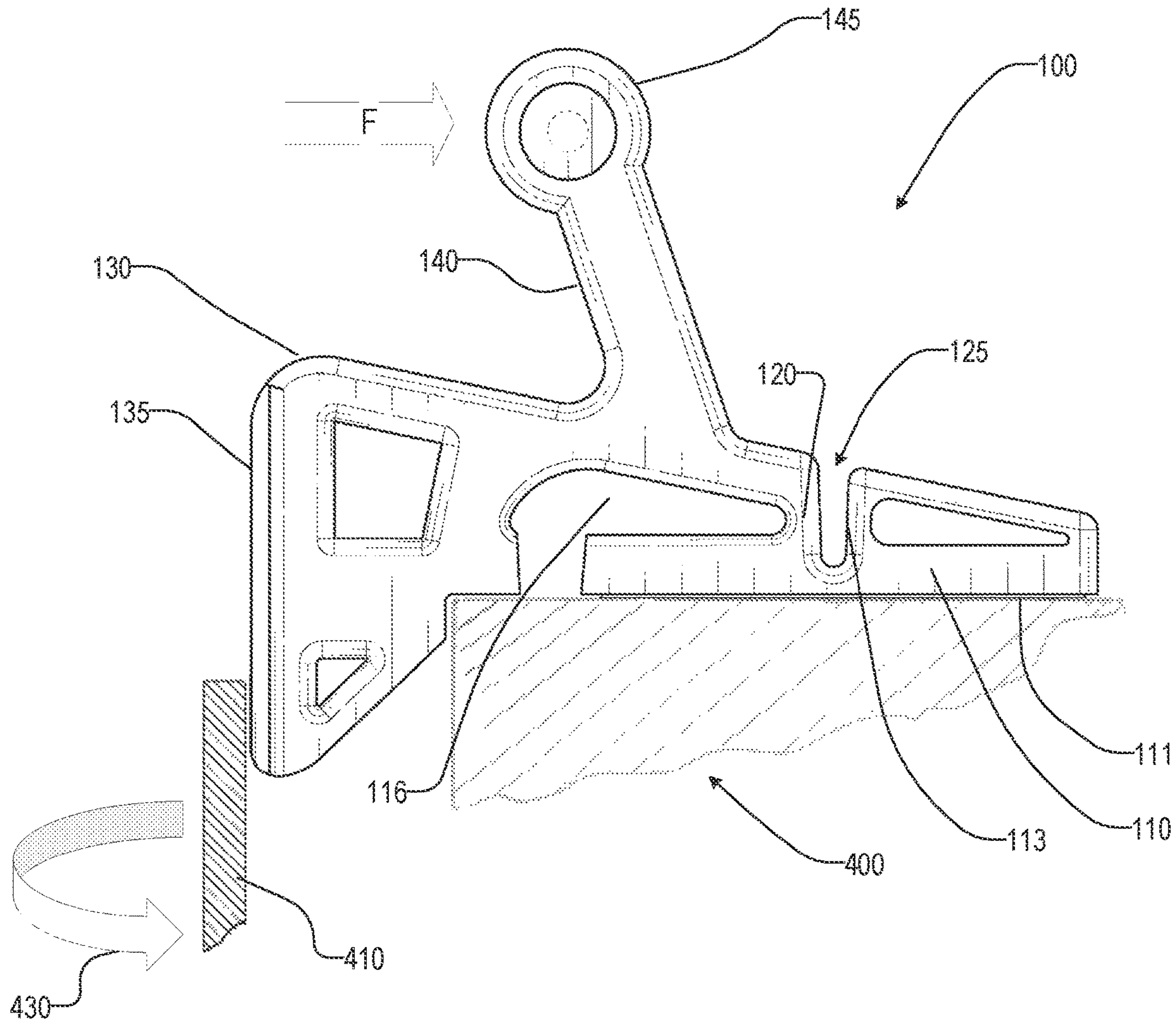
FIG. 1B shows the closure member stop of FIG. 1A with the closure member in a blocked position.
Figure 2:
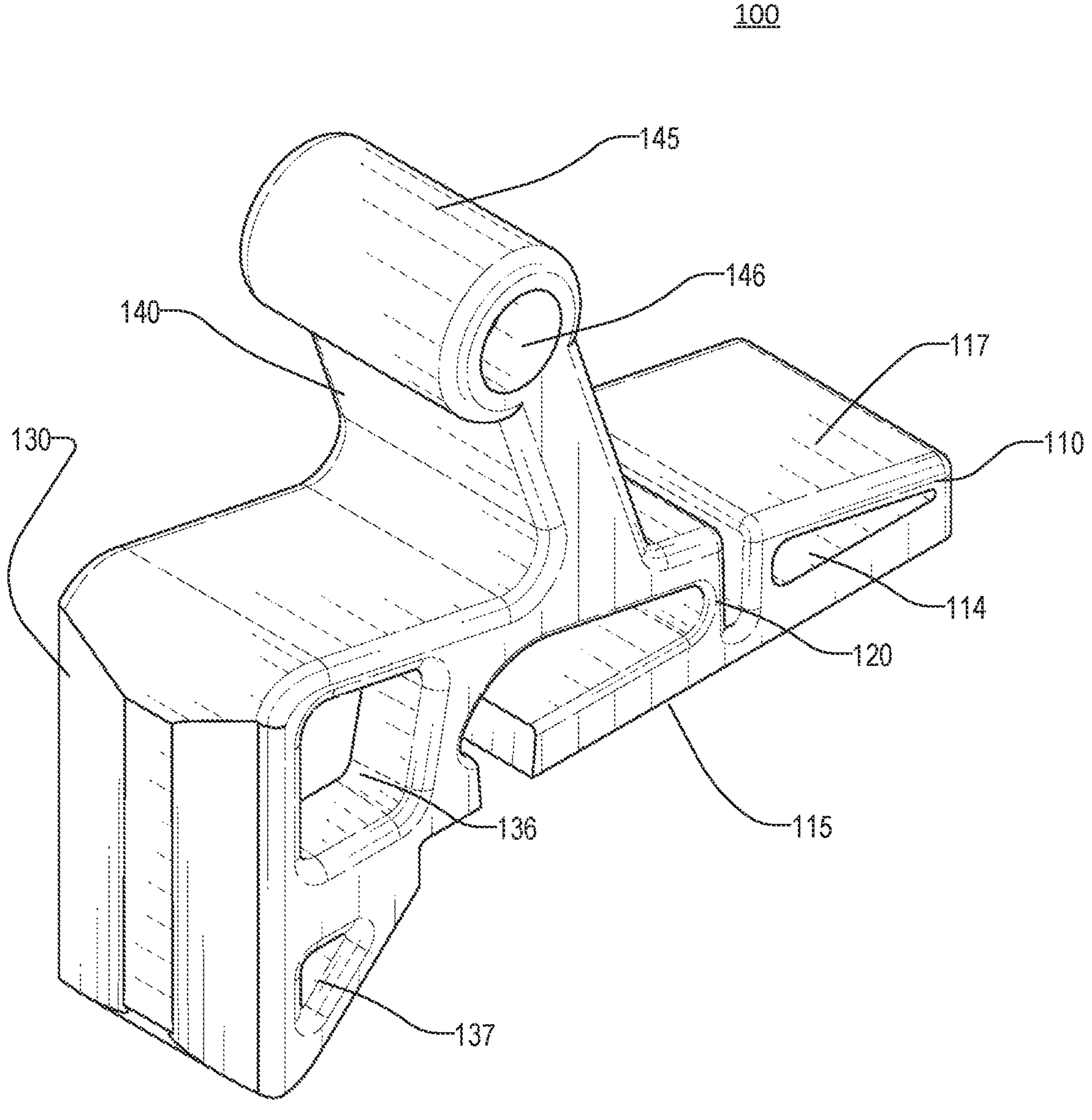
FIG. 2 is a perspective view of an example of a closure member stop consistent with the principles of the disclosure.

Closure member stop 100 may be configured to prevent inadvertent complete closure of a closure member until so desired by a user, as well as to keep user limbs and appendages clear of a closure member swing path during operation. FIG. 1A is an right elevation view of the closure member stop 100 installed at an installation point that is on top of an enclosure 400 with a closure member 410 in a closed position, while FIG. 1B shows the closure member stop 100 of FIG. 1A with the closure member 410 in a closing-but-blocked position. FIG. 2 provides a perspective view of the exemplary closure member stop.

Closure member 100 may include a base 110, a flexure 120, a cushion 130, and a lever 140, among others. Stop 100 and its associated components may be formed of a material that is flexible, elastic, and/or resilient, such as, for example, a polymer, urethane, rubber, an elastomer, a thermoplastic elastomer, or the like. In some implementations, the flexible, elastic, and/or resilient material may include or contain nanoparticles that increase the material's strength, elastic, or other desirable properties.

In some implementations, stop 100 may be made of, or primarily of, molded urethane or cast urethane, and may be monolithic, i.e., all components of stop 100 being unitarily molded to form one single piece.

According to some implementations, different components of stop 100 may be fabricated of different materials, including some components that are made of non-flexible, non-elastic, and/or non-resilient materials. For example, flexure 120 may comprise a flexible, elastic, and/or resilient material (e.g., urethane), while other portions of stop 100 may comprise a different material(s), including materials that are not flexible or elastic, such as a non-elastic and/or non-flexible polymer, metal, wood, etc. Composite materials such as, for example, metal over-molded with a flexible polymer may also be implemented for various components of stop 100.

According some embodiments, the overall dimensions of closure member stop 100 may be approximately 7.5 inches (19 cm) tall (+/−33 percent), 8.75 inches (22.2 cm) long (+/−30 percent), and 2.75 inches (7.0 cm) wide (+/−75 percent).

Cushion 130 may be configured to stop, impede, or otherwise engage with a closure member 410 during opening and/or closing of the closure member 410, and therefore, may include at least a portion that extends into a swing path 430 of the closure member when the closure member stop 100 is at rest in the installed position.

Cushion 130 may include an angled face 133 and an impact face 135, among others. Angled face 133 may be angled obliquely relative to a plane formed by bottom portion 115, and may extend at the oblique angle θ from a distal end of impact face 135 toward base 110. The oblique angle θ associated with angled face 133 may range from about 20 degrees to about 60 degrees. According to some embodiments the angle θ may be 45 degrees.

Figure 3:
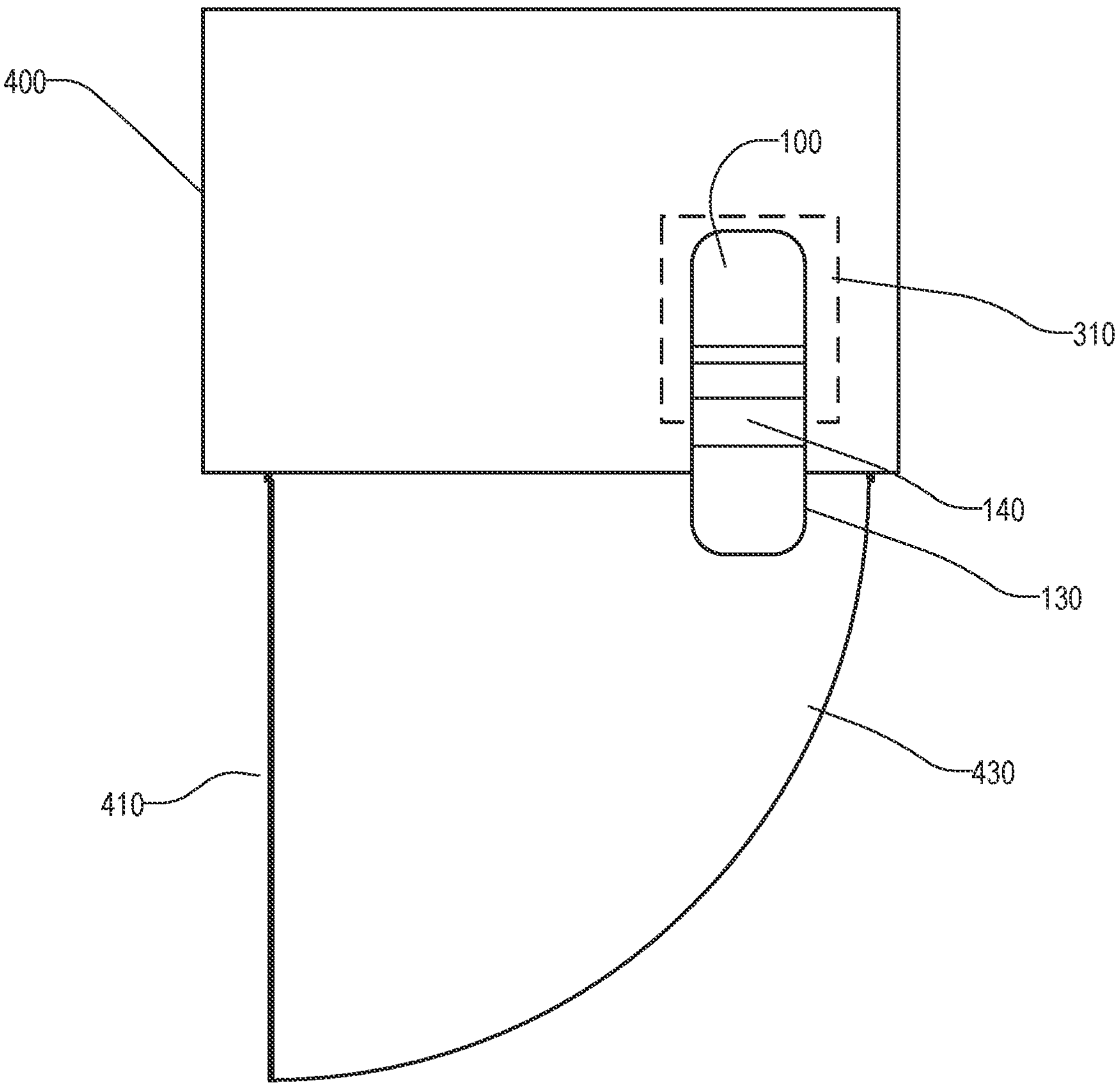
FIG. 3 is a top view of the closure member stop installed on an installation point of an enclosure and highlighting a swing path of a closure member according to some embodiments consistent with the principles of the disclosure.

Angled face 133 may be configured to interface with a closure member 410, at least during opening of the closure member 410 from a closed position, to cause movement of the cushion 130 away from the swing path 430 of closure member 410. In other words, closure member 410 may exert a force upon angled face 133 during opening of closure member 410 such that closure member 410 slides along angled face 133, thereby driving, pushing, or forcing angled face 133 out of the swing path 430 of closure member 410. In the example shown in FIGS. 1A and 1B where the stop 100 is installed on top of the enclosure 400, opening the closure member 410 drives or forces the cushion 130 upward as the closure member pushes on the angled face 133. An exemplary swing path 430 of closure member 410 is shown in FIG. 3.

In some embodiments, the angled face 133 may comprise various coatings and/or coverings to facilitate sliding and/or to reduce wear. For example, angled face 133 may include a metallic plate or other device configured to reduce friction between angled face 133 and closure member 410. Alternatively, or in addition, a chemical coating may be applied to angled face to reduce wear.

Impact face 135 may be configured to stop, impede, or otherwise interface with closure member 410 during closing of closure member 410, for example, by blocking swing path 430 to prevent closure member 410 from reaching a fully closed position unless a force F is applied to lever 150, via, for example, knob 145. As noted previously, blocking the swing path 430 will prevent or reduce injuries or damage caused by crushing a body part or an object between the closure member 410 and the enclosure 400.

According to some embodiments, cushion 130 may include one or more voids configured, for example, to modify a resistance and damping of the cushion 130, for example, to reduce or prevent bounce during a closing event when closure member contacts and is impeded by the impact face 133. Such voids may be, for example, through holes, blind holes, concavities, scrapings, etc., configured such that at least some of the material forming cushion 130 is removed to form the void. Such voids may be formed by any suitable material removal techniques, for example, formation during molding, drilling, machining, cutting, stamping, etc.

For example, a first void 136 may be provided at a position distant from angled face 133 with a second smaller void 136 being positioned nearest a distal portion of cushion 130. Voids 136 and 137 may be of any size to enable a desired level of modification to resistance and damping of cushion 130. Other embodiments may have no voids, or different voids than those shown in the example of FIGS. 1 and 2.

According to some exemplary embodiments, cushion 130 may further include a support notch having a first face 138 and a second face 139, the first face 138 being coplanar with and extending parallel to a bottom portion 115 of base 110, and second face 139 extending perpendicularly to the first face 138 toward the closure member 410. First face 138 of the support notch may act as a stop to prevent cushion 130 from passing too far into swing path 430, while second face 139 may act as a stop to prevent cushion 130 from being pushed backward and upward during a closing of closure member 410.

Similarly to angled face 133, impact face 135 may also include one or more coverings or coatings to reduce wear and/or damage to impact face 135, for example, due to repeated impact from closure member 410. In such embodiments, a plate having a hardness greater than the material forming closure member 100 (e.g., metal plate) may be included on a surface of impact face 135. Alternatively, such a plate may be overmolded with material of closure member 100.

Base 110 comprising a bottom portion 115 and a top portion 117 opposite the bottom portion, may be configured for affixing closure member 100 to an installation point 310 (e.g., an area of a frame and/or case) of an enclosure having a closure member 410 (e.g., a door). For example, where the installation point 310 is substantially flat (e.g., an area on the flat top or flat side of a safe enclosure), bottom portion 115 may also be substantially flat such that a substantial portion of bottom portion 115 may be in contact with the surface of the installation point associated with the enclosure 400.

Alternatively, where a contoured installation point 310 is intended for closure member stop 100, bottom portion 115 may be molded to include the anticipated contours of installation point 310 to provide a flush installation.

Top portion 117 may be positioned opposite bottom portion 115 as taken in a direction away from an installation point 310 associated with an enclosure 410, e.g., as shown in FIG. 2. Top portion 117 may be of any desirable form and may present various features intended to enhance functionality of closure member stop 100. For example, top portion 117 may include a lift stop 113 opposite flexure 120 on or against which at least a portion of flexure 120 and/or lever 140 is configured to abut when the lever is operated to remove the cushion 130 from swing path 430.

According to some embodiments, lift stop 113 may be formed based on or using a material void 125 associated with (e.g., next to) flexure 120, which will be described in greater detail below. Alternatively, or in addition, lift stop 113 may include additional material molded or overmolded in a desirable location for preventing over-rotation about flexure 120.

Base 110 may include one or more affixing means configured to affix base 110 to a surface associated with installation point 310. In some embodiments, the affixing means may comprise an adhesive 111, e.g., very high bond (VHB) double sided tape. In some other embodiments (not shown), the affixing means may be in the form of a spray adhesive 111 or a liquid adhesive 111, such as epoxy, cyanoacrylate (super glue), or the like. Alternatively, affixing means may use or include other conventional types of fasteners such as bolts, nuts, screws, rivets, etc.

Flexure 120 may be any suitable flex or hinge type joint, and is configured to provide a flexible or bendable, operable connection between cushion 130 and base 110 enabling cushion 130 of closure member stop 100 to move, rotate, hinge, or pivot around or relative to flexure 120. For example, flexure 120 may comprise an area of reduced thickness in a molded closure member stop 100, similar to a living hinge configuration, by way of at least one material void 125 and/or 116. Material voids 125 and 116 may be formed during molding of closure member stop 100, for example. Alternatively, or in addition, material voids 125 and 116 may be formed by any post fabrication method such as cutting, drilling, machining, stamping, etc. According to various embodiments, a minimum thickness of the flexure 120 along its length may range between approximately 0.1 inch (2.5 mm) and 1.25 inch (30 mm), for example, 0.2 inch (5 mm), 0.4 inch (10 mm), 0.6 inch (15 mm), or 0.8 inch (20 mm).

Alternatively, other flexure type configurations may be implemented, for example, a spring loaded hinge or a butt hinge. One of skill in the art will understand that any such implementation is intended to fall within the scope of the present disclosure.

The configuration of flexure 120 enables the movement of cushion 130 out of the swing path 430 of closure member 410 during an opening event (e.g., when the door 410 of the safe 400 is being opened), based on or caused by the force exerted by closure member 410 on angled face 133. As described above, as closure member 410 opens, closure member 410 contacts and exerts force on angled face 133. The closure member 410 displaces the cushion 130 as it slides along the angled face 133, thereby causing the cushion and lever portion of the stop 100 to flex or pivoting about flexure 120. This moves cushion 130 away from and out of the swing path 430. In the example shown where the stop 100 is mounted on the top of the enclosure 400, the closure member 410 may then pass under the flexed-up cushion 130 of the closure member stop 100 to be moved to a fully opened position.

After the closure member 410 has cleared the distal portion of cushion 130, the cushion 130 automatically returns or rebounds to its original position, for example, due to the elasticity and/or resiliency of the material (e.g., urethane) that forms flexure 120 or due to a biasing force (e.g., a spring) in embodiments that use a hinge for the flexure 120, such as a barrel hinge or piano hinge. And during a closing event (e.g., when the door 410 of the safe 400 is being closed), the closure member 410 may impact, be blocked by, be stopped by, be impeded by, and/or come to rest upon or against cushion 130 as shown at FIG. 1B.

Lever 140 may extend from closure member stop 100 in a direction away from installation point 310, and may be of any suitable shape enabling a user to apply a force F thereto to operate, flex, or bend the flexure 120 of the closure member stop 100 and move cushion 130 away from or out of the swing path 430 of closure member 410.

According some embodiments, lever 140 may be elongate with a proximal end positioned between flexure 120 and cushion 130. A length of lever 140 may range from approximately 1.25 inches (3.2 cm) to 4.25 inches (10.8 cm), for example, 2.75 inches (7 cm) or 3.5 inches (8.8 cm).

Lever 140 may extend away from the base 110 at an oblique angle β ranging from about 95 degrees to about 130 degrees. A position from which lever 140 may extend may be approximately 0.25 inch (6.4 mm) to 1.0 inch (2.5 cm), for example, 0.5 inch (1.3 cm) from flexure 120 and approximately 2.5 inches (6.4 cm) to 5 inches (12.7 cm) for example, 3 inches (7.6 cm) from an end portion of angled face 133.

Lever 140 may include a knob 145 configured to facilitate operation and grip by a user. Knob 145 may be positioned at a distal end of lever 140 and may be of any suitable shape to facilitate operation by a user, while also having desirable ergonomic aspects. For example, knob 145 may be cylindrical in shape, the cylinder extending along a width of lever 140. A diameter of the knob may range between approximately 1 inch (2.5 cm) and 2 inches (5 cm).

When in the position shown in FIG. 1B, cushion 130 blocks, stops, impedes, and/or prevents closure member 410 from completely closing, until and unless a user exerts a force F on lever 140 (e.g., via knob 145) to move or pivot cushion 130 away from and out of the swing path 430 to allow closure member 410 to fully close (i.e., to contact the frame of enclosure 400). The user force F causes the closure member stop 100 to bend or flex at or near the flexure 120, causing a pivoting or rotation of cushion 130, which moves it out of the way of closure member 410. Thus, the user must intentionally operate lever 140 with at least one appendage (e.g., a hand) in order to fully close closure member 410, thereby ensuring that the operating hand cannot be in between closure member 410 and enclosure 400.

In some embodiments, the stop 100 may be configured (e.g., by varying the width of the flexure 120, and/or the flexibility/elasticity of the material from which the flexure 120 is formed, and/or the length/leverage of the lever 140) such that the user force F on lever 140 required to move or pivot cushion 130 out of the swing path 430 requires the use of both of the user's hands on lever 140. Such a configuration thus ensures that both of the user's hands are not between closure member 410 and enclosure 400. In such embodiments, the force F required to move the cushion 130 fully away from or out of the swing path 430 may range between approximately 100 N to 350 N, for example 150 N.

As noted, in various embodiments, the dimensions of flexure 120, knob 145, lever 140, and distances between the components may be designed to adjust leverage to arrive at a desired level for force F. In addition, the flexibility/elasticity of the flexure 120's material may also be designed for a desired level of force F.

The base 110 of the closure member stop 100 may include one or more openings or voids (e.g. void 114) as seen in the Figures. Other embodiments of closure member stop 100 may have more or fewer voids as desired, and in some instances, no openings or holes may be provided. Still other embodiments may have different positioning for various voids other than those positions shown in the Figures.

Figure 4:
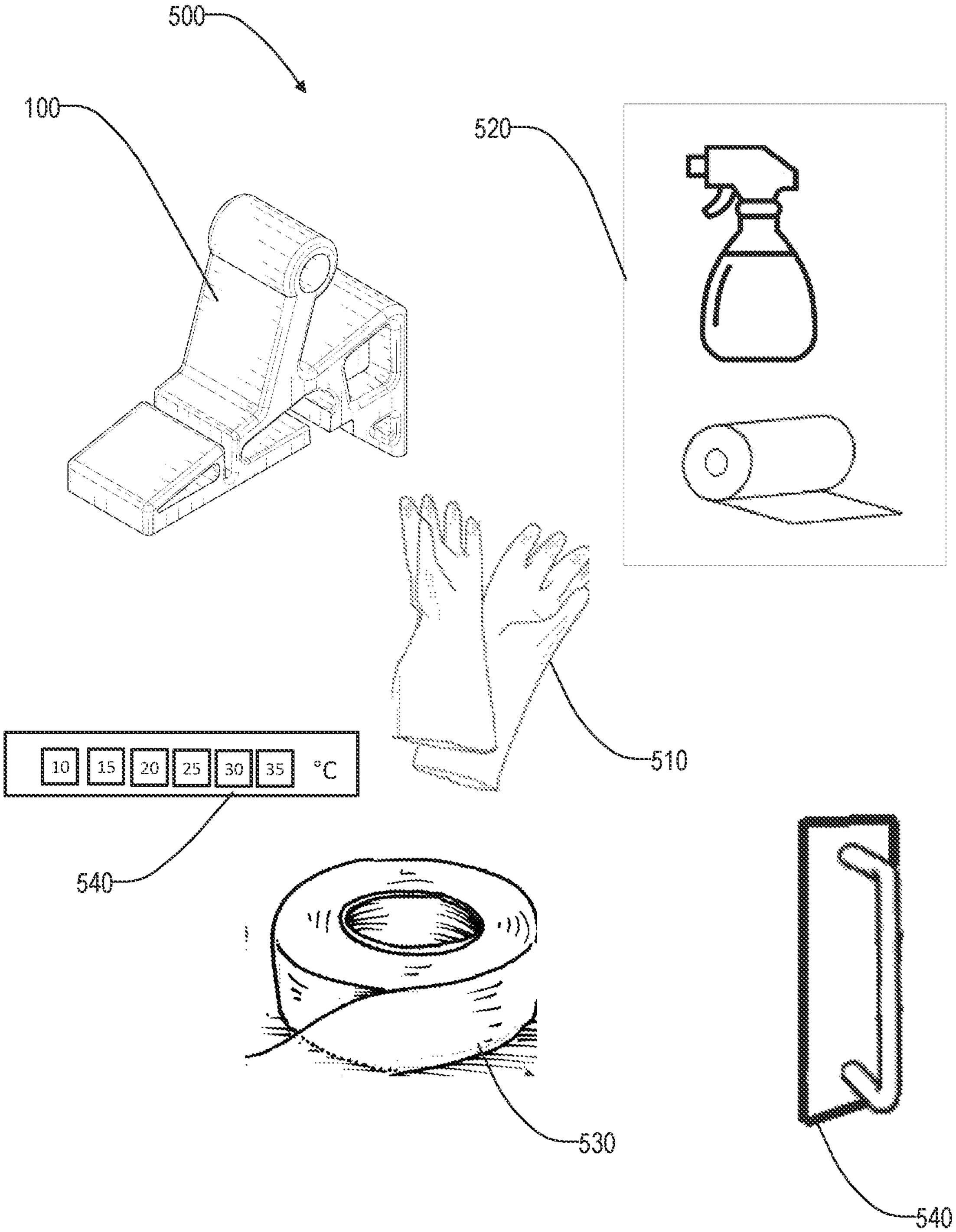
FIG. 4 is a schematic representation of an exemplary kit according to embodiments of the present disclosure.

FIG. 4 is a schematic representation of an exemplary kit according to embodiments of the present disclosure. Kit 500 may include, among others, a closure member stop 100, personal protective equipment 510, cleaning supplies 520, adhesive 530, a temperature measuring device 540, and a handle 550, among others (e.g., distance measuring tools, marking tools, scraping tools, abrasives, etc).

Personal protective equipment (PPE) 510 may be configured to protect an installer of closure member stop 100 from chemicals, such as cleaning fluids and adhesives, during installation of closure member stop 100. PPE 510 may include, for example, rubber gloves (e.g., nitrile, neoprene, etc.), protective eyewear, protective clothing, air filters, etc.

Cleaning supplies 520 may include items for cleaning the surface or area that will be the installation point 310 such that the base 110 can then be securely, enduringly, and successfully adhered or otherwise affixed to the installation point 310 on an enclosure 400. For example, cleaning supplies 520 may include absorbing items (e.g., paper towels) and cleaning solutions (e.g., surface cleaning spray, alcohol wipes, etc.) for removing dirt, grease, and other substances that may interfere with securely and enduringly affixing the stop 100, among others.

Adhesive 530, as described above, may be or include a double-sided adhesive tape, for adhering base 110 to installation point 310. According to some embodiments, adhesive 530 may be temperature sensitive (e.g., thermosetting adhesives, VHB, etc.)

Temperature measuring device 540 may include a temperature measuring strip, a thermometer, an infrared temperature sensing gun, etc. configured to measure a temperature of one or more of the installation point 310, adhesive 530, and base 110, so that the stop 100 can be installed when the temperature is within a range that allows the adhesive 530 to be applied in a manner that results in a secure and enduring bond between the stop 100 and enclosure 400. In addition to temperature measuring device 540, a heating device (not shown) may also be provided, particularly where a thermoset adhesive is provided.

A separate handle 540 that may be attached to closure member 410 (e.g., to the door 410 of a steel safe 400) may be provided. In some embodiments, handle 540 may be made of the same or similar material from which the closure member stop 100 is made. In other embodiments, handle 540 may be made of a different material, as desired.

In some embodiments, handle 540 may be attached to closure member 410 in a similar manner to that of base 110 at installation point 310 (e.g., using VHB double-sided tape 530).

When a handle 540 is affixed to closure member 410, because one of the user's hands is on handle 540 while the other hand applies user force F to the lever 140, handle 540 may aid in preventing either of the user's hands from being positioned between closure member 410 and a frame of enclosure 400 during a closing event, thereby further reducing or even eliminating the risk of injury.

As noted previously, employing the herein described embodiments with a safe (i.e., a secure, locking enclosure) is just one possible implementation. The closure member stop 100 (and handle 540) may be used with any device that has a closure member (e.g., a heavy door), that poses an injury hazard to a user's body parts, especially fingers.

Affixing means, methods, locations, etc. described in the present disclosure are to be considered exemplary and not intended to limit the scope of the disclosure. Other possible affixing means, methods, and locations may be implemented without departing from the scope of the present disclosure.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

What is claimed is:

1. A closure member stop for impeding a closure member of an enclosure, the closure member stop comprising:

a base having a top portion opposite a bottom portion, the bottom portion being configured for affixing to an installation point associated with the closure member;

a flexure extending away from the top portion, wherein the flexure comprises a living hinge;

a cushion comprising an angled face and an impact face, the impact face being configured to interface with the closure member at least during closing of the closure member, and the angled face being configured to interface with the closure member at least during opening of the closure member, wherein the flexure provides an operable hinge connection between the cushion and the base such that the cushion pivots relative to the base around the flexure;

a lever operably connected to the cushion and the flexure, and configured such that upon application of a force to the lever, the cushion is moved in a direction toward or away from a swing path of the closure member according to a vector of the applied force, wherein, prior to application of the force, at least a portion of the cushion extends into a swing path of the closure member when the closure member stop is at rest in the installed position;

wherein a material void, partially defined by the flexure, is positioned in the base rearward of the flexure and opposite of the cushion.

2. A closure member stop for impeding a closure member of an enclosure, the closure member stop comprising:

a base having a top portion opposite a bottom portion, the bottom portion being configured for affixing to an installation point associated with the closure member;

a flexure extending away from the top portion;

a cushion comprising an angled face and an impact face, the impact face being configured to interface with the closure member at least during closing of the closure member, and the angled face being configured to interface with the closure member at least during opening of the closure member, wherein the flexure provides an operable hinge connection between the cushion and the base such that the cushion pivots relative to the base around the flexure;

a lever operably connected to the cushion and the flexure, and configured such that upon application of a force to the lever, the cushion is moved in a direction toward or away from a swing path of the closure member according to a vector of the applied force, wherein, prior to application of the force, at least a portion of the cushion extends into a swing path of the closure member when the closure member stop is at rest in the installed position;

wherein a material void, partially defined by the flexure, is positioned in the base rearward of the flexure and opposite of the cushion;

wherein a lift stop, opposite the flexure, is formed on the base using the material void and on which at least a portion of the flexure is configured to abut when the lever is operated to completely remove the cushion from the swing path.

3. The closure member stop according to claim 1, wherein the cushion comprises a support notch having a first face and a second face, the first face being coplanar with and extending parallel to the bottom portion, and the second face extending perpendicularly to the first face toward the closure member.

4. The closure member stop according to claim 3, wherein the second face is configured to, when the closure member contacts the impact face, interface with a mounting frame of the closure member.

5. The closure member stop according to claim 1, wherein the cushion comprises one or more voids configured to modify a resistance of the cushion.

6. The closure member stop according to claim 1, wherein the closure member stop is a monolithic structure.

7. The closure member stop according to claim 1, wherein the closure member stop comprises a resilient material.

8. The closure member stop according to claim 7, wherein the resilient material comprises at least one of a molded urethane and a cast urethane.

9. The closure member stop according to claim 1, wherein the closure member comprises a swinging door.

10. The closure member stop according to claim 1, wherein the installation point associated with the closure member is an exterior surface of a safe body.

11. The closure member stop according to claim 1, wherein the bottom portion comprises an adhesive configured to affix the base to the installation point.

12. The closure member stop according to claim 1, wherein an angle of the angled face is configured such that, during opening of the closure member, contact of the closure member on the angled face forces the cushion to move in a direction away from the swing path.

13. The closure member stop according to claim 1, wherein the lever comprises a knob positioned at a distal end of the lever.

14. The closure member stop according to claim 1, wherein the lever extends from the closure member stop at an oblique angle relative to the base at a position between the flexure and the cushion.

15. A closure member stop kit comprising:

a closure member stop comprising:

a base having a top portion opposite a bottom portion, the bottom portion being configured for affixing to an installation point associated with the closure member;

a cushion connected to the base and comprising an angled face and an impact face, the impact face being configured to interface with the closure member at least during closing of the closure member, and the angled face being configured to interface with the closure member at least during opening of the closure member;

a flexure extending away from the top portion and providing an operative hinge connection between the cushion and the base such that the cushion pivots relative to the base around the flexure, wherein the flexure comprises a living hinge;

a lever operably connected to the cushion and the flexure, and configured such that upon application of a force to the lever, the cushion is moved in a direction toward or away from a swing path of the closure member according to a vector of the applied force, wherein, prior to application of the force, at least a portion of the cushion extends into a swing path of the closure member when the closure member stop is in the installed position;

wherein a material void, partially defined by the flexure, is positioned in the base rearward of the flexure and opposite of the cushion;

at least one fastener and/or at least one adhesive; and at least one surface cleaning device.

16. The kit according to claim 15, comprising a temperature measuring device for measuring a temperature of the installation point.

17. The kit according to claim 15, comprising a handle configured to be affixed to a surface of the closure member.

18. The kit according claim 15, wherein the at least one adhesive comprises at least one of an adhesive strip, an adhesive spray, and a two-sided tape.

19. A closure member stop for impeding a closure member of an enclosure, the closure member stop comprising:

a base having a top portion opposite a bottom portion, the bottom portion being configured for affixing to the enclosure;

a flexible flexure that is connected to the base;

a cushion comprising an angled face and an impact face, the impact face being configured to interface with the closure member during closing of the closure member, and the angled face being configured to interface with the closure member during opening of the closure member, wherein the cushion is connected to the flexible flexure and the flexible flexure is a living hinge between the cushion and the base such that the cushion pivots relative to the base around the flexible flexure; and a lever that is connected to the cushion and configured such that applying a force to the lever causes the flexible flexure to bend and causes the cushion is moved in a direction away from a swing path of the closure member;

wherein, when no force is applied to the lever, the flexible flexure causes at least a portion of the cushion to extend into the swing path of the closure member;

wherein a material void, partially defined by the flexure, is positioned in the base rearward of the flexure and opposite of the cushion.

20. The closure member stop according to claim 19, wherein the closure member stop is a monolithic structure.

* * * * *